US011092839B2

(12) United States Patent
Choi et al.

(10) Patent No.: US 11,092,839 B2
(45) Date of Patent: Aug. 17, 2021

(54) DISPLAY APPARATUS AND METHOD OF DRIVING THE SAME

(71) Applicant: Samsung Display Co., Ltd., Yongin-si (KR)

(72) Inventors: Nam-Gon Choi, Yongin-si (KR); Kyoung Ho Lim, Suwon-si (KR); Kangmin Kim, Hwaseong-si (KR); Jinpil Kim, Suwon-si (KR); Taehyeong An, Hwaseong-si (KR); Seokha Hong, Seoul (KR); Moon Shik Kang, Hwaseong-si (KR); Jaehoon Lee, Seoul (KR); Kunhee Jo, Yongin-si (KR); Seoung-Bum Pyoun, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 19 days.

(21) Appl. No.: 16/235,443

(22) Filed: Dec. 28, 2018

(65) Prior Publication Data

US 2019/0204672 A1 Jul. 4, 2019

(30) Foreign Application Priority Data

Jan. 2, 2018 (KR) .......................... 10-2018-0000371

(51) Int. Cl.
*G09G 3/34* (2006.01)
*G02F 1/1335* (2006.01)
(Continued)

(52) U.S. Cl.
CPC .. *G02F 1/133514* (2013.01); *G02F 1/133512* (2013.01); *G02F 1/133528* (2013.01);
(Continued)

(58) Field of Classification Search
CPC ..... G09G 2300/0456; G09G 2330/021; G09G 3/001; G09G 3/34; G09G 2320/062;
(Continued)

(56) References Cited

U.S. PATENT DOCUMENTS 8,711,085 B2* 4/2014 Ward ................... G09G 3/3426
345/102
9,001,023 B2* 4/2015 Mashiba .............. G09G 3/3413
345/102
(Continued)

FOREIGN PATENT DOCUMENTS

KR 10-2013-0019250 A 2/2013
KR 10-2016-0017373 A 2/2016
(Continued)

*Primary Examiner* — Duc Q Dinh
(74) *Attorney, Agent, or Firm* — Lewis Roca Rothgerber Christie LLP

(57) ABSTRACT

A display apparatus includes a backlight unit including a first light source for outputting a first color light, and a second light source for outputting a second color light that is different from the first color light, a switching element layer on the backlight unit, and including a plurality of switching elements, a liquid crystal layer on the switching element layer, and a color conversion layer on the liquid crystal layer, including a color-converting material for converting a color of light passing therethrough, including a first color area, a second color area, and a third color area, and including quantum dot particles.

17 Claims, 10 Drawing Sheets

(51) Int. Cl.
*G02F 1/13357* (2006.01)
*G09G 3/36* (2006.01)

(52) U.S. Cl.
CPC .. *G02F 1/133603* (2013.01); *G02F 1/133606* (2013.01); *G09G 3/3413* (2013.01); *G09G 3/3607* (2013.01); *G09G 3/3688* (2013.01); *G02F 1/133614* (2021.01); *G02F 2202/36* (2013.01); *G09G 2310/08* (2013.01); *G09G 2320/0276* (2013.01); *G09G 2320/064* (2013.01); *G09G 2320/0606* (2013.01); *G09G 2320/0666* (2013.01); *G09G 2360/16* (2013.01)

(58) Field of Classification Search
CPC .............. G09G 2320/066; G09G 5/10; G09G 2320/0666; G09G 3/3413; G09G 2320/0242; G09G 3/3607; G09G 2320/0646; G09G 2360/16; G09G 2320/0233; G09G 2320/0693; G09G 3/3406; G09G 2320/0626; G09G 3/36; G09G 2340/06; G09G 2320/0238; G09G 2310/0237; G09G 2320/0209; G09G 2320/0686; G09G 2320/0613; G09G 2340/0407; G09G 2340/0457; G09G 3/007; G09G 3/18; G09G 3/3233; G09G 3/342; G09G 2340/0428; G09G 3/3688; G09G 2320/0276; G02F 2203/055; G02F 1/13362; G02F 2001/01791; G02F 2001/136222; G02F 1/133536; G02F 2001/133521; G02F 2001/133613; G02F 2001/133622; G02F 2001/133624; G02F 2001/133626; G02F 2202/108; G02F 2203/03; G02F 1/133514; G02F 1/133606; G02F 1/133603; G02F 1/133528; G02F 1/133621; G02F 1/133624; G02F 1/133626; G02F 1/133617
USPC .......................................................... 345/102
See application file for complete search history.

(56) References Cited

U.S. PATENT DOCUMENTS

| | | | |
|---|---|---|---|
| 9,293,091 B2 * | 3/2016 | Lee | ........................ G09G 3/3607 |
| 2009/0021471 A1 * | 1/2009 | Park | ........................ G09G 3/3413 |
| | | | 345/102 |
| 2012/0098738 A1 * | 4/2012 | Yoshida | ............... G09G 3/3406 |
| | | | 345/102 |
| 2015/0235597 A1 * | 8/2015 | Meng | ................... G09G 3/3413 |
| | | | 345/102 |
| 2016/0377263 A1 * | 12/2016 | Lee | ................... G02F 1/133606 |
| | | | 349/71 |
| 2017/0017123 A1 * | 1/2017 | Lee | ................... G02F 1/133605 |
| 2017/0261789 A1 | 9/2017 | Deng | |
| 2017/0261812 A1 | 9/2017 | Zeng | |

FOREIGN PATENT DOCUMENTS

| | | |
|---|---|---|
| KR | 10-2017-0008591 A | 1/2017 |
| KR | 10-2017-0014755 A | 2/2017 |
| KR | 10-2018-0009011 A | 1/2018 |

* cited by examiner

DISPLAY APPARATUS AND METHOD OF DRIVING THE SAME

CROSS-REFERENCE TO RELATED APPLICATION

This application claims priority to, and the benefit of, Korean Patent Application No. 10-2018-0000371, filed on Jan. 2, 2018 in the Korean Intellectual Property Office KIPO, the contents of which are herein incorporated by reference in their entireties.

BACKGROUND

1. Field

Embodiments of the present inventive concept relate to a quantum dot display apparatus including a backlight unit outputting a plurality of color lights, and a method of driving the display apparatus.

2. Description of the Related Art

As technology has developed, a display apparatus having light weight and small size has been manufactured. Conventionally, a cathode ray tube (CRT) display apparatus has been used due to performance ability and due to a competitive price. However the CRT display apparatus has issues with size or portability. Therefore, display apparatuses, such as a plasma display apparatus, a liquid crystal display apparatus, and an organic light emitting display apparatus, have been broadly used due to small size, light weight and low-power-consumption.

The display apparatus may further include a backlight unit, and a color conversion layer using quantum dots. The display apparatus may impart a desired color to the image due to the color conversion layer, and may enhance color reproducibility and luminous efficiency of the image, so that display quality may be enhanced.

Although the color reproducibility of the display apparatus including the quantum dots is enhanced, luminous efficiency may be decreased because the color light emitted from the backlight unit passes through various layers, such as a polarizer, a glass substrate, a liquid crystal layer, an electrode, quantum dot particles, scattering particles, a filter, a film and so on.

SUMMARY

Embodiments of the present inventive concept provide a display apparatus including a backlight unit for outputting a plurality of color lights, including a color conversion layer including quantum dot particles, and having enhanced display quality.

Embodiments of the present inventive concept also provide a method of driving the above-mentioned display apparatus.

In an embodiment of a display apparatus according to the present inventive concept, the display apparatus includes a backlight unit including a first light source for outputting a first color light, and a second light source for outputting a second color light that is different from the first color light, a switching element layer on the backlight unit, and including a plurality of switching elements, a liquid crystal layer on the switching element layer, and a color conversion layer on the liquid crystal layer, including a color-converting material for converting a color of light passing therethrough, including a first color area, a second color area, and a third color area, and including quantum dot particles.

The first light source may be a blue light source for outputting a blue light, and the second light source may be a white light source for outputting a white light.

The first color area may be a red color area at which the first color light of the first light source and the second color light of the second light source are converted into red light, the second color area may be a green color area at which the first color light and the second color light are converted into green light, and the third color area may be a blue color area for allowing the first color light and the second color light to pass therethrough.

The first color area may include a first quantum dot particle having a first size, the second color area may include a second quantum dot particle having a second size that is different from the first size, and the third color area may include a scattering particle.

The display apparatus may further include a blue-light-blocking filter in the first color area and in the second color area.

The first light source may include a blue light emitting diode string including a plurality of blue light emitting diodes that output the blue light, and wherein the second light source may include a white light emitting diode string including a plurality of white light emitting diodes that output the white light.

The display apparatus may further include a first polarizer between the backlight unit and the switching element layer, and a second polarizer between the liquid crystal layer and the color conversion layer.

The display apparatus may further include a third polarizer on the color conversion layer, and having a polarizing axis that is different from a polarizing axis of the second polarizer.

The display apparatus may further include an anti-reflection film on the color conversion layer including alternately and repeatedly arranged low refractive index and high refractive index layers.

The display apparatus may further include a timing controller including a dimming control part for analyzing an input image, for determining a first dimming signal of the first light source, and for determining a second dimming signal of the second light source.

The timing controller may further include a white balance control part for adjusting a white balance of an image to be displayed according to turn-on degree of the first light source and turn-on degree of the second light source.

As luminance of the input image increases, a turn-on degree of the second light source may increase, and, as chroma of the input image decreases, the turn-on degree of the second light source may increase.

When luminance of the input image is equal to, or greater than, a threshold luminance, and the input image represents an achromatic color, the first light source may be turned on and the second light source may be maximally turned on, when the luminance of the input image is equal to, or greater than, the threshold luminance, and the input image represents a chromatic color, the first light source may be turned on and the second light source may be turned on, and, when the luminance of the input image is less than the threshold luminance, the first light source may be turned on and the second light source may be turned off.

When the input image represents an achromatic color, and luminance of the input image is less than a threshold luminance, the first light source may be turned off and the second light source may be turned on, when the input image represents the achromatic color, and the luminance of the input image is equal to, or greater than, the threshold luminance, the first light source may be turned on and the second light source may be turned on, and, when the input image represents a chromatic color, the first light source may be turned on and the second light source may be turned on.

The timing controller may be configured to determine the first dimming signal of the first light source and the second dimming signal of the second light source according to a input mode signal, wherein, when the input mode signal represents a color intensive mode, the first light source is turned on and the second light source is turned off, wherein, when the input mode signal represents a high luminance and wide color volume mode, the first light source is turned on and the second light source is turned on, and wherein, when the input mode signal represents a low power mode, the first light source is turned off and the second light source is turned on.

In an embodiment of a method of driving a display apparatus according to the present inventive concept, the method includes outputting a first color light using a first light source, outputting a second color light using a second light source, converting the first color light of the first light source and the second color light of the second light source into red at a first color area of a color conversion layer, converting the first color light of the first light source and the second color light of the second light source into green at a second color area of the color conversion layer, passing through the first color light of the first light source and the second color light of the second light source at a third color area of the color conversion layer, and determining a first dimming signal of the first light source and a second dimming signal of the second light source based on an input image.

As luminance of the input image increases, a turn-on degree of the second light source may increase, and, as chroma of the input image decreases, the turn-on degree of the second light source may increase.

The method may further include turning on the first light source and maximally turning on the second light source when luminance of the input image is equal to, or greater than, a threshold luminance, and the input image represents an achromatic color, turning on the first and second light sources when the luminance of the input image is equal to, or greater than, the threshold luminance, and the input image represents a chromatic color, and turning on the first light source and turning off the second light source when the luminance of the input image is less than the threshold luminance.

The method may further include turning off the first light source and turning on the second light source when the input image represents an achromatic color, and luminance of the input image is less than a threshold luminance, turning on the first and second light sources when the input image represents the achromatic color and the luminance of the input image is equal to, or greater than, the threshold luminance, and turning on the first and second light sources when the input image represents a chromatic color.

The method may further include determining the first dimming signal of the first light source and the second dimming signal of the second light source according to a input mode signal, turning on the first light source and turning off the second light source when the input mode signal represents a color intensive mode, turning on the first and second light sources when the input mode signal represents a high luminance and wide color volume mode, and turning off the first light source and turning on the second light source when the input mode signal represents a low power mode.

According to the display apparatus and the method of driving the display apparatus, the backlight unit includes a first light source and a second light source, which may be a blue light source and a white light source, respectively, and the timing controller controls dimming of the first light source and dimming of the second light source according to the input image. Thus, the luminous efficiency of the quantum dot display apparatus including the quantum dot particles may be enhanced. Therefore, the display quality of the display apparatus may be enhanced.

BRIEF DESCRIPTION OF THE DRAWINGS

The above and other features of the present inventive concept will become more apparent by describing detailed embodiments thereof with reference to the accompanying drawings, in which.

DETAILED DESCRIPTION

Figure 1:
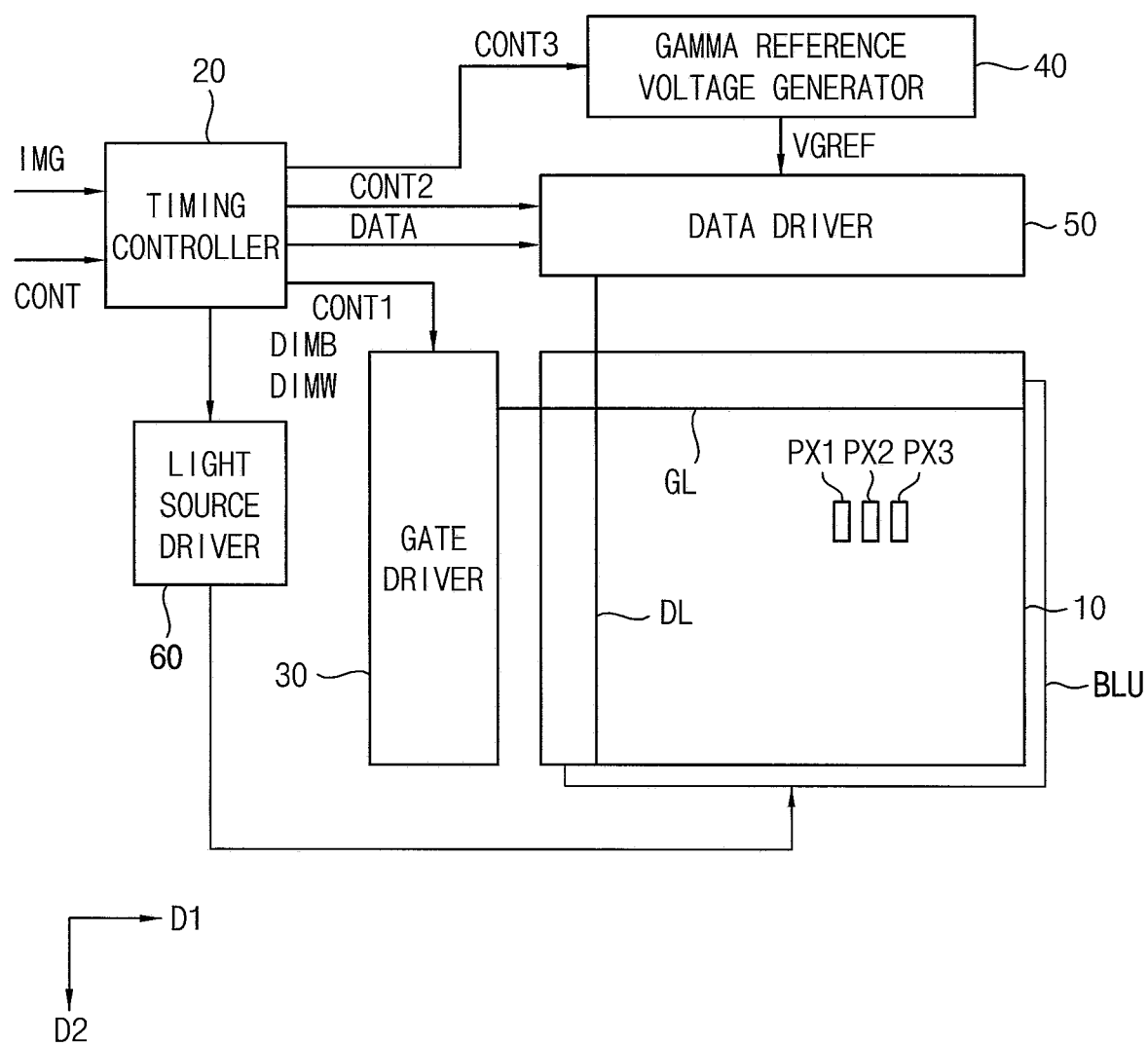
FIG. 1 is a block diagram illustrating a display apparatus according to an embodiment.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present invention.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus according to an embodiment.

Referring to FIG. 1, the display apparatus may include a display panel 10 and a display panel driver. The display panel driver may include a timing controller 20, a gate driver 30, a gamma reference voltage generator 40, and a data driver 50. The display apparatus may further include a backlight unit BLU, and a light source driver 60 for driving the backlight unit BLU.

The display panel 10 may include a plurality of gate lines GL, a plurality of data lines DL, and a plurality of pixel electrodes electrically connected to the gate lines GL and the data lines DL. The gate lines GL may extend in a first direction D1, and the data lines DL may extend in a second direction D2 crossing the first direction D1.

The display panel 10 may include a first base substrate, a second base substrate facing the first base substrate, and a liquid crystal layer between the first base substrate and the second base substrate. The gate lines GL, the data lines DL, the pixel electrodes, and switching elements may be formed on the first base substrate. A common electrode may be formed on the second base substrate. Alternatively, the common electrode may be formed on the first base substrate.

The timing controller 20 may receive input image data IMG and an input control signal CONT from an external apparatus. The input image data IMG may include red image data, green image data, and blue image data. The input control signal CONT may include a master clock signal and a data enable signal. The input control signal CONT may further include a vertical synchronizing signal and a horizontal synchronizing signal.

The timing controller 20 may generate a first control signal CONT1, a second control signal CONT2, a third control signal CONT3, and a data signal DATA based on the input image data IMG and the input control signal CONT.

The timing controller 20 may generate the first control signal CONT1 for controlling an operation of the gate driver 30 based on the input control signal CONT, and may output the first control signal CONT1 to the gate driver 30. The first control signal CONT1 may include a vertical start signal and a gate clock signal.

The timing controller 20 may generate the second control signal CONT2 for controlling an operation of the data driver 50 based on the input control signal CONT, and may output the second control signal CONT2 to the data driver 50. The second control signal CONT2 may include a horizontal start signal and a load signal.

The timing controller 20 may generate the data signal DATA based on the input image data IMG. The timing controller 20 may output the data signal DATA to the data driver 50.

The timing controller 20 may generate the third control signal CONT3 for controlling an operation of the gamma reference voltage generator 40 based on the input control signal CONT, and may output the third control signal CONT3 to the gamma reference voltage generator 40.

The timing controller 20 may generate dimming signal(s) DIMB and DIMW for controlling a dimming operation of the backlight unit BLU based on the input image data IMG, and may output the dimming signal DIMB and DIMW to the light source driver 60.

The gate driver 30 may generate gate signals for driving the gate lines GL in response to the first control signal CONT1 received from the timing controller 20. The gate driver 300 outputs the gate signals to the gate lines GL.

The gamma reference voltage generator 40 may generate a gamma reference voltage VGREF in response to the third control signal CONT3 received from the timing controller 20. The gamma reference voltage generator 40 may provide the gamma reference voltage VGREF to the data driver 50. The gamma reference voltage VGREF may have a value corresponding to a level of the data signal DATA.

In an embodiment, the gamma reference voltage generator 40 may be located in the timing controller 20, or in the data driver 50.

The data driver 50 may receive the second control signal CONT2 and the data signal DATA from the timing controller 20, and may receive the gamma reference voltages VGREF from the gamma reference voltage generator 40. The data driver 50 may convert the data signal DATA into data voltages having an analog type using the gamma reference voltages VGREF. The data driver 50 may output the data voltages to the data lines DL.

The light source driver 60 may receive the dimming signal DIMB and DIMW from the timing controller 20. The light source driver 60 may convert the dimming signal DIMB and DIMW into a light source driving signal, and may output the light source driving signal to the backlight unit BLU.

The display apparatus may include a plurality of pixel areas PX1, PX2, and PX3 arranged in a matrix form. The pixel areas PX1, PX2, and PX3 may include a first pixel area PX1, a second pixel area PX2, and a third pixel area PX3, which are located adjacent to each other. A light-blocking area may be between the first to third pixel areas PX1, PX2, and PX3.

Figure 2:
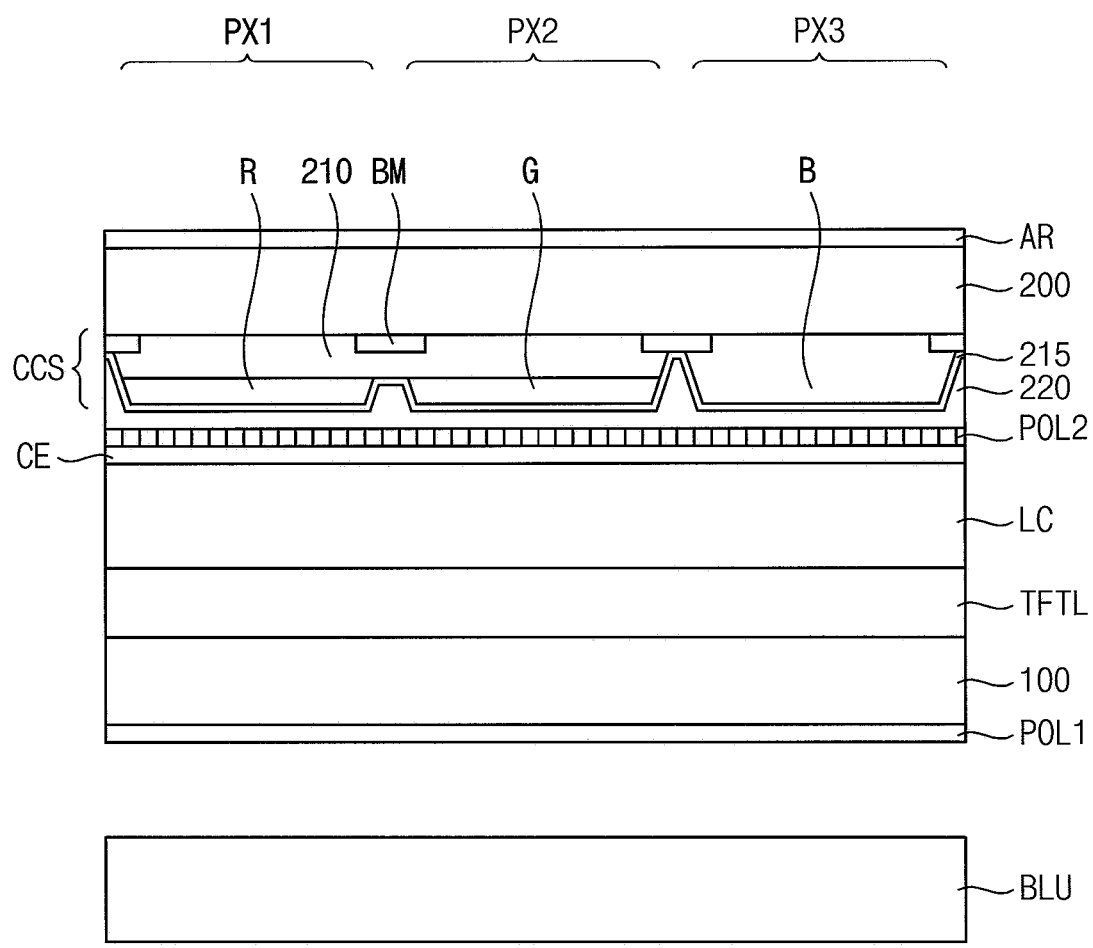
FIG. 2 is a cross-sectional view illustrating a display area of the display apparatus of FIG. 1.
Figure 3:
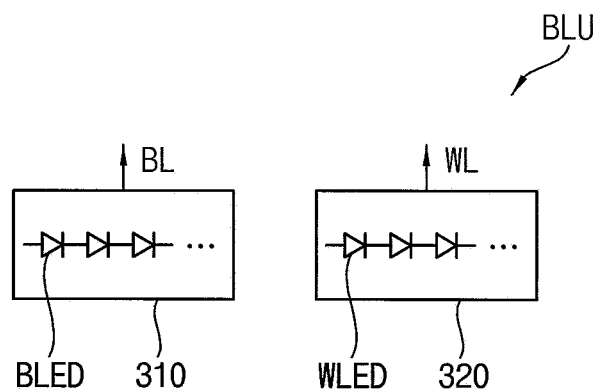
FIG. 3 is a block diagram illustrating a backlight unit of FIG. 1.

FIG. 2 is a cross-sectional view illustrating a display area of the display apparatus of FIG. 1. FIG. 3 is a block diagram illustrating the backlight unit BLU of FIG. 1.

Referring to FIGS. 1 to 3, the display apparatus may include the backlight unit BLU, a first polarizer POL1, a liquid crystal layer LC, a second polarizer POL2, and the color conversion layer CCS.

The backlight unit BLU may be located under the first polarizer POL1, and may provide light to the first polarizer POL1 and the liquid crystal layer LC. The backlight unit BLU includes a first light source 310 and a second light source 320 for outputting different respective color lights. The first light source 310 may be a blue light source for outputting a blue light BL having a wavelength range of blue. The second light source 320 may be a white light source for outputting a white light WL. The backlight unit BLU generates the blue light BL having the wavelength range of blue, provides the blue light BL toward the liquid crystal layer LC, generates the white light WL, and provides the white light WL toward the liquid crystal layer LC.

The first polarizer POL1 may be on the backlight unit BLU. The first polarizer POL1 may be a linear polarizer that can linearly polarize light passing therethrough. The first polarizer POL1 may be an absorption type polarizing plate, such as a polyvinyl alcohol (PVA) polarizing plate, or may be a reflection type polarizing plate, such as a wire grid polarizer.

The liquid crystal layer LC may be between the first polarizer POL1 and the second polarizer POL2. The liquid crystal layer LC may include liquid crystal molecules having optical anisotropy. The liquid crystal molecules are driven by electric field, so that an image is displayed by selectively passing or blocking light through the liquid crystal layer LC.

The second polarizer POL2 may be on the liquid crystal layer LC. The second polarizer POL2 may be a linear polarizer that can linearly polarize light passing therethrough. The second polarizer POL2 may be an absorption type polarizing plate, such as a polyvinyl alcohol (PVA) polarizing plate, or may be a reflection type polarizing plate, such as a wire grid polarizer. A polarizing axis of the second polarizer POL2 may be different than a polarizing axis of the first polarizer POL1. For example, the polarizing axis of the second polarizer POL2 may be substantially perpendicular to the polarizing axis of the first polarizer POL1.

The color conversion layer CCS may be on the second polarizer POL2. The color conversion layer CCS may include a color conversion structure, such as quantum dot particles, a phosphor, and/or a nano-cell for converting color of transmitted light.

For example, more specifically, the display apparatus may include the backlight unit BLU, the first polarizer POL1, the first base substrate 100, a switching element layer TFTL, the liquid crystal layer LC, the common electrode CE, the second polarizer POL2, a planarizing layer 220, a light-recycling filter 215, a first pattern R, a second pattern G, a third pattern B, a blue-light-blocking filter/blue-light-blocking pattern 210, a light-blocking pattern BM, the second base substrate 200 and an anti-reflection layer AR. The planarizing layer 220, the light-recycling filter 215, the first pattern R, the second pattern G, the third pattern B, the blue-light-blocking filter 210, and the light-blocking pattern BM may form the color conversion layer CCS.

The backlight unit BLU may be located under the first polarizer POL1, and may provide light to the first polarizer POL1 and the liquid crystal layer LC. The backlight unit BLU generates the blue light BL having the wavelength range of blue and provides the blue light BL toward the liquid crystal layer LC, and generates the white light WL and provides the white light WL toward the liquid crystal layer LC. The dimming operation of the first light source 310 and the second light source 320 of the backlight unit BLU may be controlled according to the input image data IMG. For example, the backlight unit BLU may provide only the blue light BL toward the liquid crystal layer LC according to the input image data IMG. Also, for example, the backlight unit BLU may provide only the white light WL toward the liquid crystal layer LC according to the input image data IMG. Further, for example, the backlight unit BLU may provide both the blue light BL and the white light WL toward the liquid crystal layer LC according to the input image data IMG.

For example, the backlight unit BLU may include a blue light emitting diode BLED for generating the blue light BL as the light source. The backlight unit BLU may include a blue light emitting diode string that includes a plurality of the blue light emitting diodes BLED connected to each other in series. For example, the backlight unit BLU may include a white light emitting diode WLED for generating the white light WL as the light source. The backlight unit BLU may include a white light emitting diode string that includes a plurality of the white light emitting diodes WLED connected to each other in series.

The first base substrate 100 may be on the backlight unit BLU. The first base substrate 100 may include a transparent insulation substrate. For example, the first base substrate 100 may include a glass substrate, a quartz substrate, a transparent resin substrate, etc. Examples of the transparent resin substrate for the first base substrate 100 may include polyimide-based resin, acryl-based resin, polyacrylate-based resin, polycarbonate-based resin, polyether-based resin, sulfonic acid containing resin, polyethyleneterephthalate-based resin, etc.

The first polarizer POL1 may be between the first base substrate 100 and the backlight unit BLU. The first polarizer POL1 may be an absorbing type polarizing plate, such as a polyvinyl alcohol (PVA) polarizing plate, which is attached on the first base substrate 100. In some example embodiment, the first polarizer POL1 may be a reflection type polarizing plate, such as a wire grid polarizer, which is formed on the first base substrate 100.

The switching element layer TFTL may be on the first base substrate 100. The switching element layer TFTL may include a signal line(s) for driving the display apparatus, such as the gate line GL and the data line DL, and the switching element may be electrically connected to the signal line, and may have a gate electrode, an active pattern, a source electrode, and a drain electrode. For example, the switching element may be a thin film transistor. The thin film transistor may be electrically connected to the pixel electrode. The thin film transistor and the pixel electrode may be formed corresponding to the first pixel area PX1, the second pixel area PX2, and the third pixel area PX3, respectively.

The second base substrate 200 may face the first base substrate 100. The second base substrate 200 may include a transparent insulation substrate. For example, the second base substrate 200 may include a glass substrate, a quartz substrate, a transparent resin substrate, etc. Examples of the transparent resin substrate for the second base substrate 200 may include polyimide-based resin, acryl-based resin, polyacrylate-based resin, polycarbonate-based resin, polyether-based resin, sulfonic acid containing resin, polyethyleneterephthalate-based resin, etc.

The light-blocking pattern BM may be on the second base substrate 200. The light-blocking pattern BM may be formed in a lattice shape having portions respectively between the first, second, and third pixel areas PX1, PX2, and PX3 to separate the pixel areas. The light-blocking pattern BM may include a light-blocking material. Here, the first, second, and third pixel areas PX1, PX2, and PX3 are regions where light for displaying an image is transmitted.

The color conversion layer CCS may include a color-converting material to convert the color of light passing through the color conversion layer CCS. The color conversion layer CCS may include a first color area R (e.g., first pixel area PX1), a second color area G (e.g., second pixel area PX2), and a third color area B (e.g., third pixel area PX3). A first pattern R is located in the first color area R. A second pattern G is located in the second color area G. A third pattern B is located in the third color area B. The color conversion layer CCS may include quantum dot (QD) particles.

The blue-light-blocking filter 210 may be on the second base substrate 200 on which the light-blocking pattern BM is located. The blue-light-blocking filter 210 may be formed in the first pixel area PX1 and the second pixel area PX2. The blue-light-blocking filter 210 may be formed by alternately laminating at least two layers having different refractive indices. A wavelength band of transmitted light excluding a wavelength band of blue light BL can be transmitted through the blue-light-blocking filter 210, and the wavelength band of blue light BL may be blocked by the blue-light-blocking filter 210. The blue light BL that is blocked by the blue-light-blocking filter 210 may be reflected and optically recycled.

The first pattern R may be on the blue-light-blocking filter 210 in the first pixel area PX1. The first pattern R may convert the blue light BL and the white light WL provided from the backlight unit BLU to red light. For example, the first pattern R may include first quantum dot particles. The first quantum dot particle may have a first size. The first quantum dot particles may convert the blue light BL and the white light WL to the red light. The first pattern R may include a color-converting material, such as the first quantum dot particles and/or red phosphor. The first pattern R may further include scattering particles.

The second pattern G may be on the blue-light-blocking filter 210 in the second pixel area PX2. The second pattern G may convert the blue light BL and the white light WL provided from the backlight unit BLU to green light. For example, the second pattern G may include second quantum dot particles. The second quantum dot particle may have a second size that is different from the first size. The second quantum dot particles may convert the blue light BL and the white light WL to the green light. For example, the second quantum dot particle may be less than or fewer than the first quantum dot particle. The second pattern G may include a color-converting material, such as the second quantum dot particles and/or green phosphor. The second pattern G may further include scattering particles.

The red or green quantum dot may be a material that has a nano-scaled structure, and may include several hundred to several thousand atoms. Because the quantum dot is very small in size, a quantum confinement effect may occur. The quantum confinement effect may indicate that an energy band gap of an object is increased when the object becomes smaller than nano size. When the light having energy that is higher than that of the band gap is incident to the quantum dot, the quantum dot may absorb the light, and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The third pattern B may be on the second base substrate 200 in the third pixel area PX3. The third pattern B might not convert the blue light BL and the white light WL provided from the backlight unit BLU. The third pattern B may include scattering particles for changing a direction of the blue light BL and the white light WL without converting the wavelength of the blue light BL and the white light WL. The scattering particle may include TiO2. A size of the scattering particle may be similar to the size of the first quantum dot particle or the second quantum dot particle. In addition, the third pattern B may further include blue pigment for converting light passing therethrough to the blue light.

The planarizing layer 220 may be on the first pattern R, the second pattern G, and the third pattern B. The planarizing layer 220 may have a flat upper surface (or flat lower surface) on the first pattern R, the second pattern G, and the third pattern B, and may include organic or inorganic insulation material.

The light-recycling filter 215 may be between the planarizing layer 220 and the first pattern R, the second pattern G, and the third pattern B. The light-recycling filter 215 may be a yellow light-recycling filter. The light-recycling filter 215 may reflect light that is generated from the backlight unit BLU, and that is reflected by the first to third patterns R, G, and B and the blue-light-blocking filter 210, toward the liquid crystal layer LC, so that luminance of the display apparatus may be enhanced.

The second polarizer POL2 may be on the planarizing layer 220. The second polarizer POL2 may be a wire grid polarizer. The wire grid polarizer may include a plurality of fine lines extending in one direction, which are formed of metal and are arranged at regular intervals. The fine lines may have a pitch of about 50 nm (nanometer) to 150 nm. The pitch refers to a sum of a width of one fine line and a distance between adjacent fine lines. In some example embodiments, the second polarizer POL2 may be a polyvinyl alcohol (PVA) polarizing plate similar to the first polarizer POL1.

The liquid crystal layer LC may be between the common electrode CE and the switching element layer TFTL. The liquid crystal layer LC may include liquid crystal molecules having optical anisotropy. The liquid crystal molecules are driven by an electric field, so that an image is displayed by passing light through, or blocking light with, the liquid crystal layer LC.

Although the switching element layer TFTL and the common electrode CE are located at opposite sides with respect to the liquid crystal layer LC in the present embodiment, the present inventive concept is not limited thereto. Alternatively, the switching element layer TFTL and the common electrode CE may be located at the same side with respect to the liquid crystal layer LC.

The anti-reflection film AR may be on the second base substrate 200. The anti-reflection film AR may be formed by alternately and repeatedly arranging a low refractive index layer having a relatively small refractive index, and a high refractive index layer having a relatively large refractive index. Reflection on a surface of the display apparatus may be reduced by the destructive interference effect.

Figure 4A:
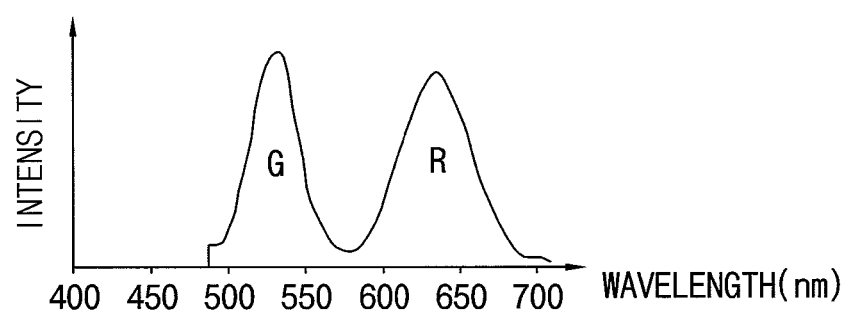
FIG. 4A is a graph illustrating spectrums of light of a first pixel area and a second pixel area of FIG. 2.
Figure 4B:
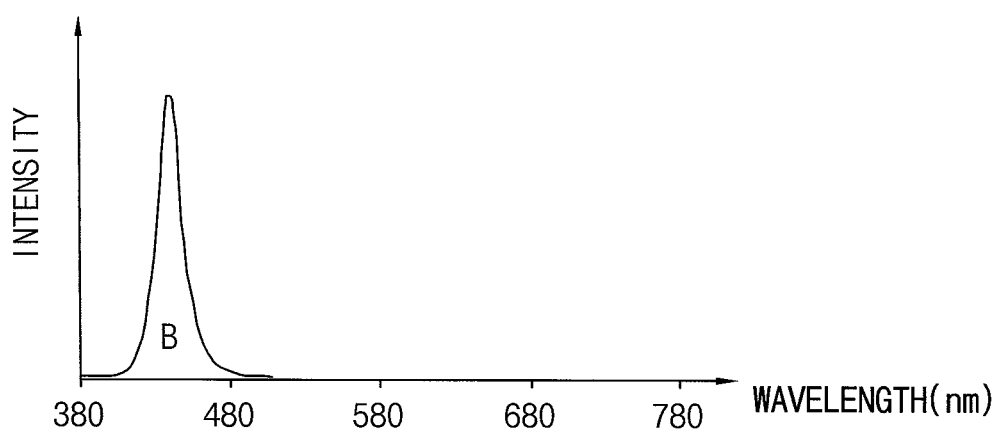
FIG. 4B is a graph illustrating a spectrum of blue light of a third pixel area of FIG. 2.
Figure 4C:
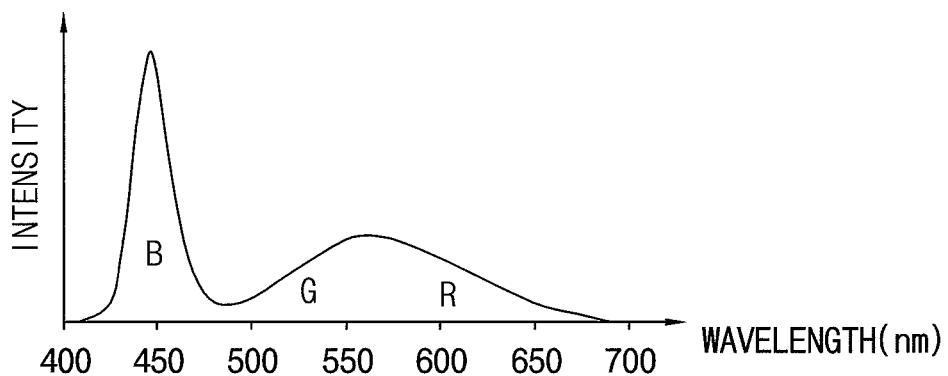
FIG. 4C is a graph illustrating a spectrum of white light of the third pixel area of FIG. 2.

FIG. 4A is a graph illustrating spectrums of light of the first pixel area and the second pixel area of FIG. 2. FIG. 4B is a graph illustrating a spectrum of the blue light of the third pixel area of FIG. 2. FIG. 4C is a graph illustrating a spectrum of the white light of the third pixel area of FIG. 2.

Referring to FIG. 4A, the red light having a wavelength having a peak between about 600 nm and about 700 nm is emitted at the first pixel area PX1. In FIG. 4a, the green light having a wavelength having a peak between about 500 nm and about 550 nm is emitted at the second pixel area PX2.

Referring to FIG. 4B, a first blue light having a wavelength having a peak between about 380 nm and about 480 nm is emitted at the third pixel area PX3 by the first light source 310 of the backlight unit BLU, which may be a blue light source 310. The first blue light emitted at the third pixel area PX3 may have a relatively sharp waveform.

Referring to FIG. 4C, a second blue light having a wavelength having a peak between about 400 nm and about 500 nm is emitted at the third pixel area PX3 by the second light source 320 of the backlight unit BLU, which may be a white light source 320. The second blue light emitted at the third pixel area PX3 may have a relatively unsharp waveform. The red light and the green light may be emitted at the third pixel area PX3 by the white light source 320 of the backlight unit BLU. When the red light and the green light are not emitted at the third pixel area PX3, the white light source 320 may be turned off.

A color volume of the red light and the green light based on the blue light BL of the first light source 310 may be wider than a color volume of the red light and the green light based on the white light WL of the second light source 320. Thus, the first light source 310 may have an intensity that is greater than an intensity of the second light source 320 to represent wide color volume of the display image.

Luminance of the white light WL of the second light source 320 passing through the third pixel area PX3 may be much greater than luminance of the blue light BL of the first light source 310 passing through the third pixel area PX3. Thus, the second light source 320 may have the intensity that is greater than the intensity of the first light source 310 to increase the luminance of the display image.

In addition, when the display image represents an achromatic color, the target image may be displayed using only the second light source 320.

Figure 5:
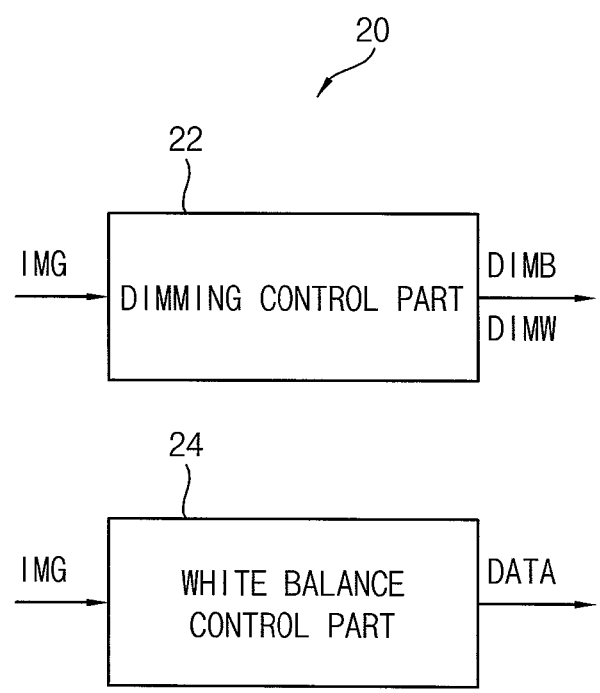
FIG. 5 is a block diagram illustrating a timing controller of FIG. 1.
Figure 6:
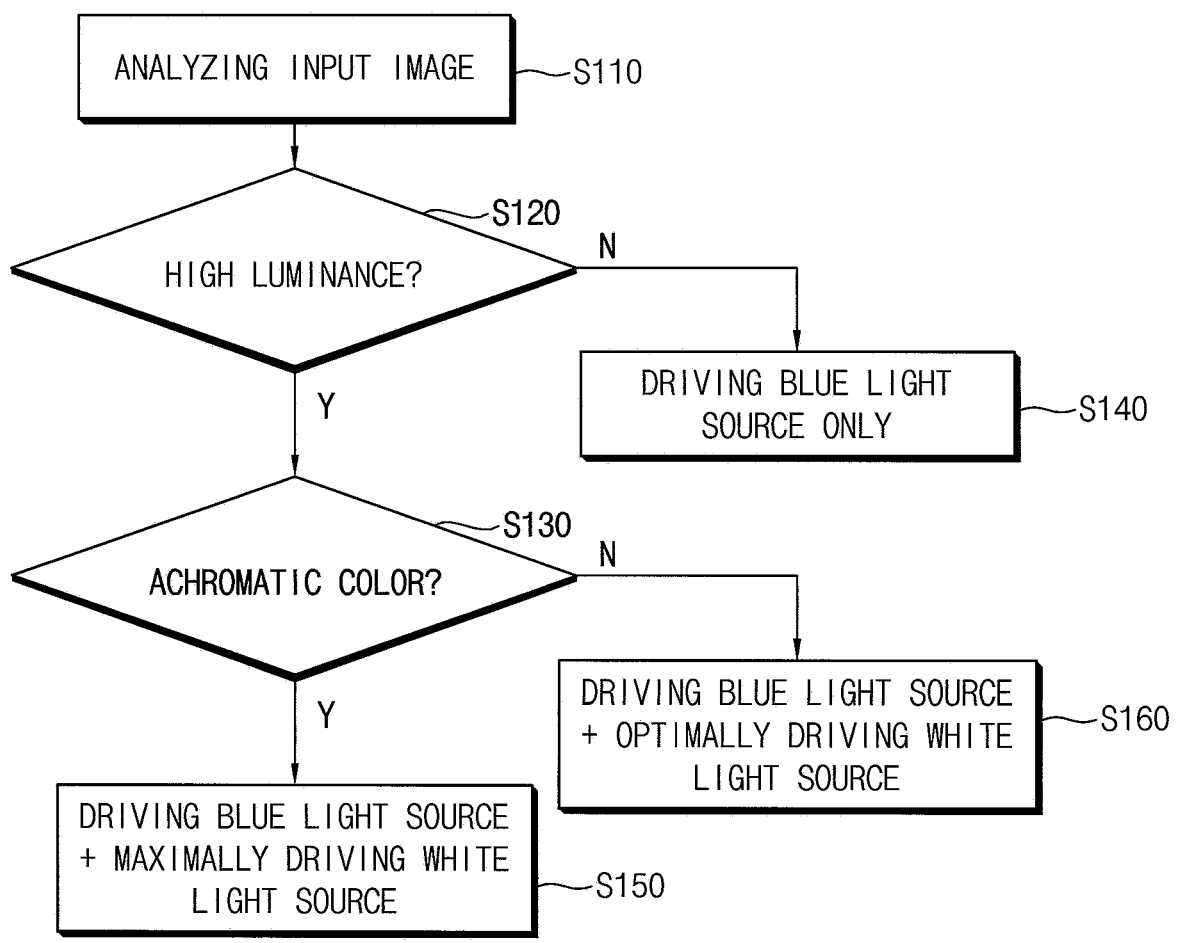
FIG. 6 is a flowchart illustrating an operation of the timing controller of FIG. 1.
Figure 7A:
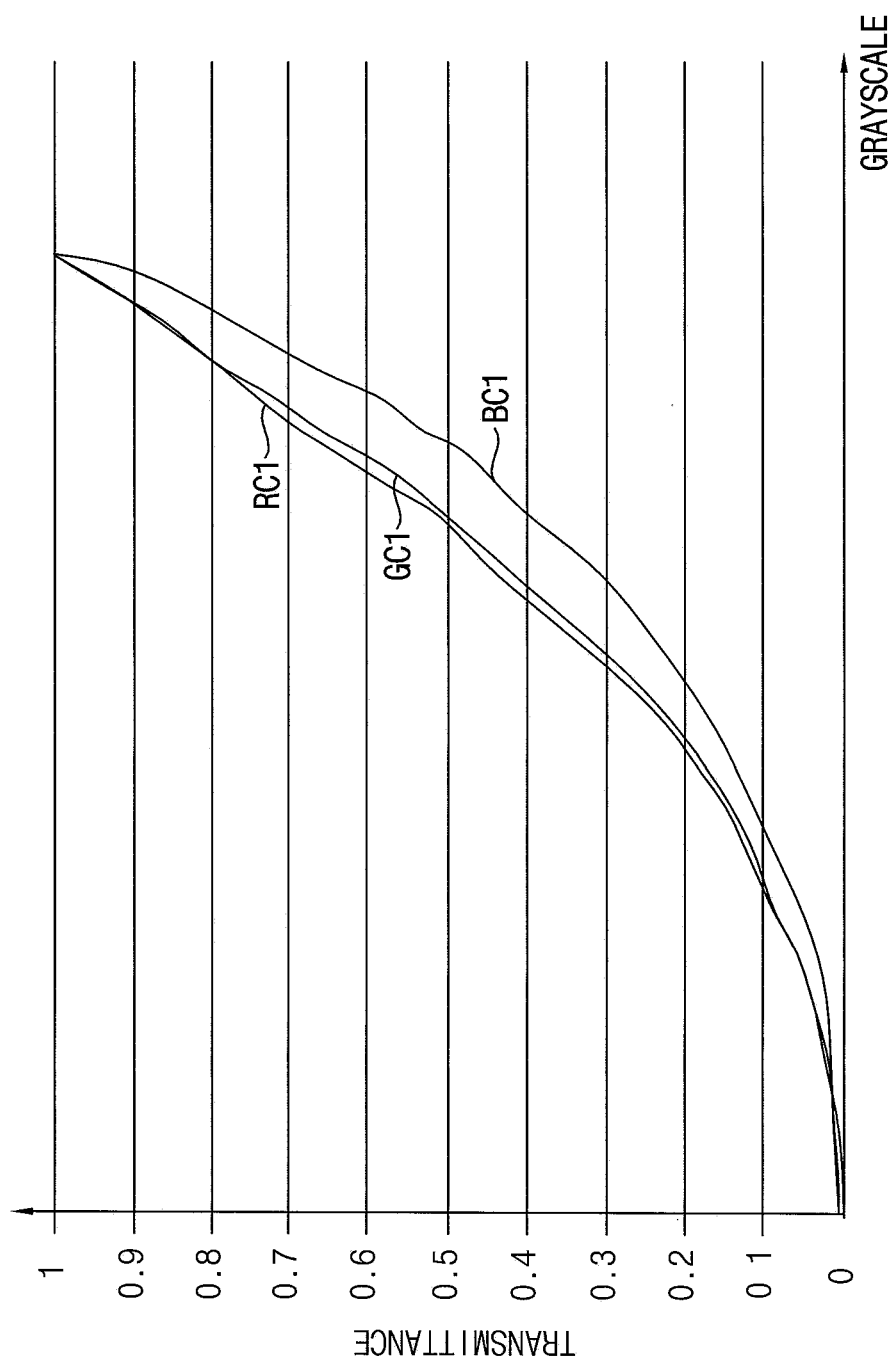
FIG. 7A is a graph illustrating transmittances of a liquid crystal layer for colors to control white balance of a display image when only a first light source of the backlight unit of FIG. 1 is driven.
Figure 7B:
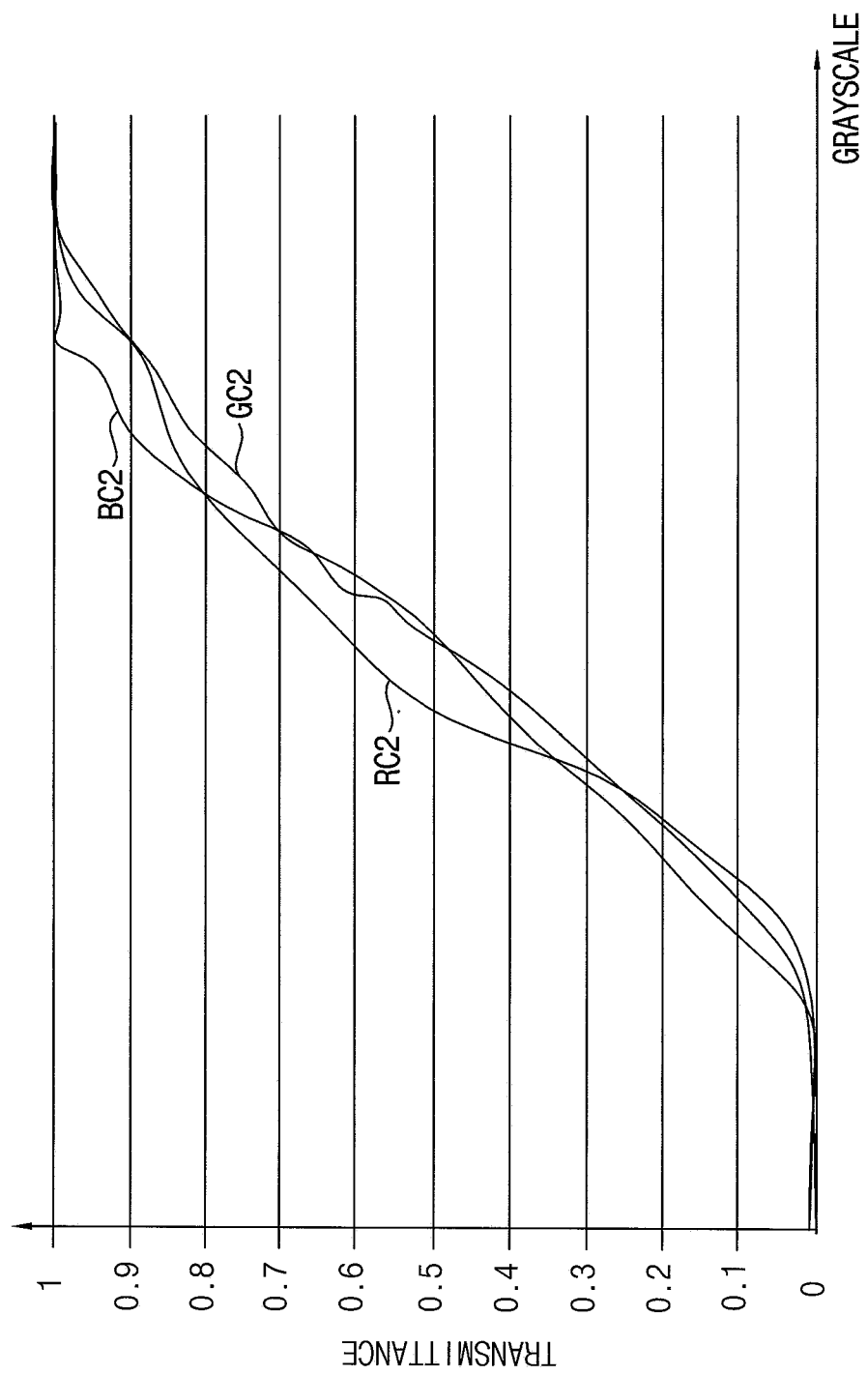
FIG. 7B is a graph illustrating the transmittances of the liquid crystal layer for the colors to control the white balance of the display image when the first light source of the backlight unit of FIG. 1 is driven and a second light source of the backlight unit of FIG. 1 is maximally driven.

FIG. 5 is a block diagram illustrating the timing controller 20 of FIG. 1. FIG. 6 is a flowchart illustrating an operation of the timing controller 20 of FIG. 1. FIG. 7A is a graph illustrating transmittances of the liquid crystal layer LC for colors to control white balance of a display image when only the first light source 310 of the backlight unit BLU of FIG. 1 is driven. FIG. 7B is a graph illustrating the transmittances of the liquid crystal layer LC for the colors to control the white balance of the display image when the first light source 310 of the backlight unit BLU of FIG. 1 is driven and the second light source 320 of the backlight unit BLU of FIG. 1 is maximally driven.

Referring to FIGS. 1 to 7B, the timing controller 20 may include a dimming control part 22 and a white balance control part 24.

The dimming control part 22 analyzes the input image data IMG, and determines the first dimming signal DIMB of the first light source 310 and the second dimming signal DIMW of the second light source 320. For example, the first dimming signal DIMB is a pulse width modulation (PWM) signal representing the intensity of the first light source 310. For example, the second dimming signal DIMW is a pulse width modulation signal representing the intensity of the second light source 320.

For example, as the luminance of the input image data IMG increases, the dimming control part 22 may generate the second dimming signal DIMW for increasing a turn-on degree of the second light source 320. As chroma of the input image data IMG decreases, the dimming control part 22 may generate the second dimming signal DIMW for increasing a turn-on degree of the second light source 320.

FIG. 6 illustrates the operation of the dimming control part 22. The dimming control part 22 analyzes the input image data IMG (operation S110).

The dimming control part 22 may determine whether the input image data IMG is a high luminance image or not (operation S120). For example, when the luminance of the input image data IMG is equal to, or greater than, a threshold luminance, the dimming control part 22 may determine the input image data IMG as the high luminance image. In contrast, when the luminance of the input image data IMG is less than the threshold luminance, the dimming control part 22 may determine the input image data IMG as not the high luminance image.

When the input image data IMG is the high luminance image, the dimming control part 22 may determine whether the input image data IMG represents the achromatic color or not (operation S130). For example, when a red grayscale value, a green grayscale value, and a blue grayscale value of the input image data IMG are the same as one another, the dimming control part 22 may determine that the input image data IMG represents the achromatic color. Alternatively, when a difference between the red grayscale value, the green grayscale value, and the blue grayscale value of the input image data IMG is equal to, or less than, a threshold difference, the dimming control part 22 may determine that the input image data IMG represents the achromatic color.

When the input image data IMG is the high luminance image and the input image data IMG represents the achromatic color, the first light source 310 may be turned on, and the second light source 320 may be maximally turned on (operation S150). When the second light source 320 is turned on, the luminance efficiency is greatly increased so that the high luminance image may be easily displayed. In addition, when the input image data IMG represents the achromatic color, the maximally turned on second light source 320 does not negatively affect the color of the display image.

When the input image data IMG is the high luminance image and the input image data IMG represents a chromatic color, the first light source 310 may be turned on, and the second light source 320 may be not maximally, or less than maximally, turned on (operation S160). Because the input image data IMG is the high luminance image, the second light source 320 may be turned on. However, when the second light source 320 is maximally turned on, the color volume of the chromatic color may be decreased. Thus, the second light source 320 may be optimally or improvably turned on in this case.

When the input image data IMG is not the high luminance image, the first light source 310 may be turned on and the second light source 320 may be turned off (operation S140). When the input image data IMG is not the high luminance image, the second light source 320 may not need to be turned on. When the input image data IMG is not the high luminance image and the second light source 320 is turned on, the color volume of the display image may be decreased due to the second light source 320 or the power consumption may be otherwise increased.

The white balance control part 24 may adjust the white balance of the image, which is displayed according to the turn-on degree of the first light source 310 and the turn-on degree of the second light source 320. The white balance control part 24 analyzes the input image data IMG to control the white balance.

FIG. 7A represents the transmittances RC1, GC1, and BC1 of the liquid crystal layer LC for colors to control the white balance when only the first light source, which may be a blue light source 310, is driven. The transmittances RC1, GC1, and BC1 of the liquid crystal layer LC may be set along the graph of FIG. 7A when only the blue light source is driven (e.g. operation S140).

FIG. 7B represents the transmittances RC2, GC2, and BC2 of the liquid crystal layer LC for colors to control the white balance when the blue light source 310 is driven and the white light source 320 is maximally driven. The transmittances RC2, GC2, and BC2 of the liquid crystal layer LC may be set along the graph of FIG. 7B when the blue light source 310 is driven and the white light source 320 is maximally driven (e.g. operation S150).

When the blue light source 310 is driven and the white light source 320 is optimally or improvably driven, transmittances for colors may be set between RC1 and RC2, between GC1 and GC2, and between BC1 and BC2 (e.g. operation S160).

According to the embodiments, the backlight unit BLU includes the first light source 310 and the second light source 320, and the timing controller 20 controls the dimming operation of the first light source 310 and the second light source 320 according to the input image. Thus, the luminous efficiency of the quantum dot display apparatus including the quantum dot particles may be enhanced. Therefore, the display quality of the display apparatus may be enhanced.

Figure 8:
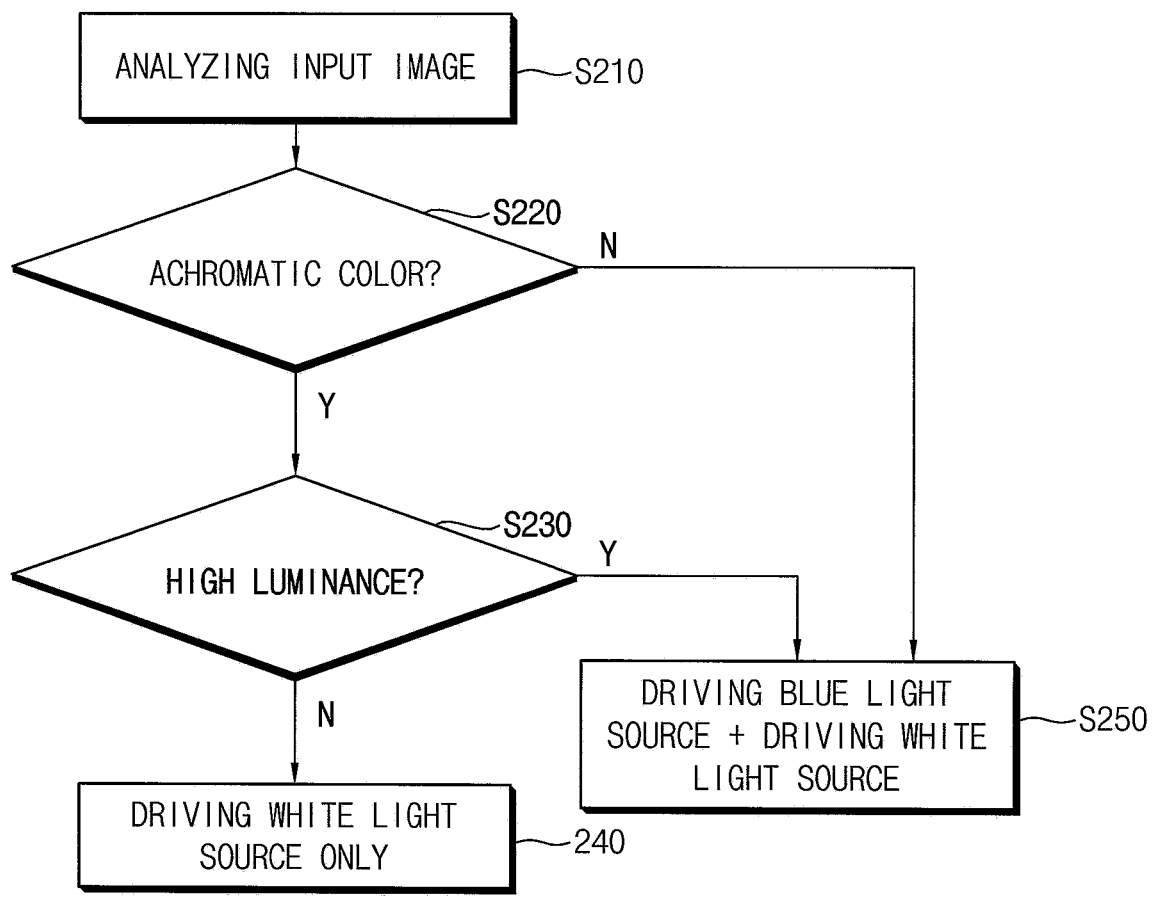
FIG. 8 is a flowchart illustrating an operation of a timing controller of a display apparatus according to an embodiment.

FIG. 8 is a flowchart illustrating an operation of a timing controller of a display apparatus according to an embodiment.

The display apparatus and the method of driving the display apparatus according to the present embodiment is substantially the same as the display apparatus and the method of driving the display apparatus of the previous embodiment that was explained referring to FIGS. 1 to 7B except for the operation of the timing controller. Thus, the same or similar reference numerals will be used to refer to the same or similar parts as those described in the previous embodiment of FIGS. 1 to 7B, and any repetitive explanation concerning the above elements will be omitted.

Referring to FIGS. 1 to 5, 7A, 7B, and 8, the display apparatus may include the display panel 10 and the display panel driver. The display panel driver may include the timing controller 20, the gate driver 30, the gamma reference voltage generator 40, and the data driver 50. The display apparatus may further include the backlight unit BLU and the light source driver 60 driving the backlight unit BLU.

For example, more specifically, the display apparatus may include the backlight unit BLU, the first polarizer POL1, the first base substrate 100, the switching element layer TFTL, the liquid crystal layer LC, the common electrode CE, the second polarizer POL2, the planarizing layer 220, the light-recycling filter 215, the first pattern R, the second pattern G, the third pattern B, the blue-light-blocking filter 210, the light-blocking pattern BM, the second base substrate 200, and the anti-reflection layer AR. The planarizing layer 220, the light-recycling filter 215, the first pattern R, the second pattern G, the third pattern B, the blue-light-blocking filter 210 and the light-blocking pattern BM may form the color conversion layer CCS.

The color conversion layer CCS may include a color-converting material to convert the color of light passing through the color conversion layer CCS. The color conversion layer CCS may include the first color area R, the second color area G, and the third color area B. The first pattern R is located in the first color area R. The second pattern G is located in the second color area G. The third pattern B is located in the third color area B. The color conversion layer CCS may include quantum dot (QD) particles.

The timing controller 20 may include the dimming control part 22 and the white balance control part 24.

The dimming control part 22 analyzes the input image data IMG and determines the first dimming signal DIMB of the first light source 310, and determines the second dimming signal DIMW of the second light source 320. For example, the first dimming signal DIMB is a pulse width modulation signal representing the intensity of the first light source 310. For example, the second dimming signal DIMW is a pulse width modulation signal representing the intensity of the second light source 320.

FIG. 8 illustrates the operation of the dimming control part 22. The dimming control part 22 analyzes the input image data IMG (operation S210).

The dimming control part 22 may determine whether the input image data IMG represents the achromatic color or not (operation S220). For example, when a red grayscale value, a green grayscale value, and a blue grayscale value of the input image data IMG are same as one another, the dimming control part 22 may determine that the input image data IMG represents the achromatic color. Alternatively, when difference(s) between the red grayscale value, the green grayscale value, and the blue grayscale value of the input image data IMG is equal to, or less than, a threshold difference(s), the dimming control part 22 may determine that the input image data IMG represents the achromatic color.

When the input image data IMG represents the achromatic color, the dimming control part 22 may determine whether the input image data IMG is a high luminance image or not (operation S230). For example, when the luminance of the input image data IMG is equal to, or greater than, a threshold luminance, the dimming control part 22 may determine the input image data IMG as the high luminance image. In contrast, when the luminance of the input image data IMG is less than the threshold luminance, the dimming control part 22 may determine the input image data IMG as not the high luminance image.

When the input image data IMG represents the achromatic color and the input image data IMG is not the high luminance image, the first light source 310 may be turned off while only the second light source is turned on (operation S240). Accordingly, when the input image data IMG represents the achromatic color, the target image may be displayed using only the white light source 320 without the blue light source 310 (e.g., when the input image data IMG is not the high luminance image).

When the input image data IMG represents the achromatic color and the input image data IMG is the high luminance image, both the first light source 310 and the second light source 320 may be turned on (operation S250). In addition, when the input image data IMG represents the chromatic color, both the first light source 310 and the second light source 320 may be turned on (operation S250). Although the input image IMG represents the achromatic color, the white light source 320 and the blue light source 310 may be turned on to display the high luminance image. In addition, when the input image data IMG represents the chromatic color, the white light source 320 and the blue light source 310 may be turned on to increase the color volume. When the input image data IMG represents the chromatic color and only the white light source 320 is turned on, the color volume may not be sufficient.

The white balance control part 24 may adjust the white balance of the image, which is displayed according to the turn-on degree of the first light source 310 and the turn-on degree of the second light source 320. The white balance control part 24 analyzes the input image data IMG to control the white balance.

According to the embodiments, the backlight unit BLU includes the first light source 310 and the second light source 320 and the timing controller 20 controls the dimming operation of the first light source 310 and the second light source 320 according to the input image data. Thus, the luminous efficiency of the quantum dot display apparatus including the quantum dot particles may be enhanced. Therefore, the display quality of the display apparatus may be enhanced.

Figure 9:
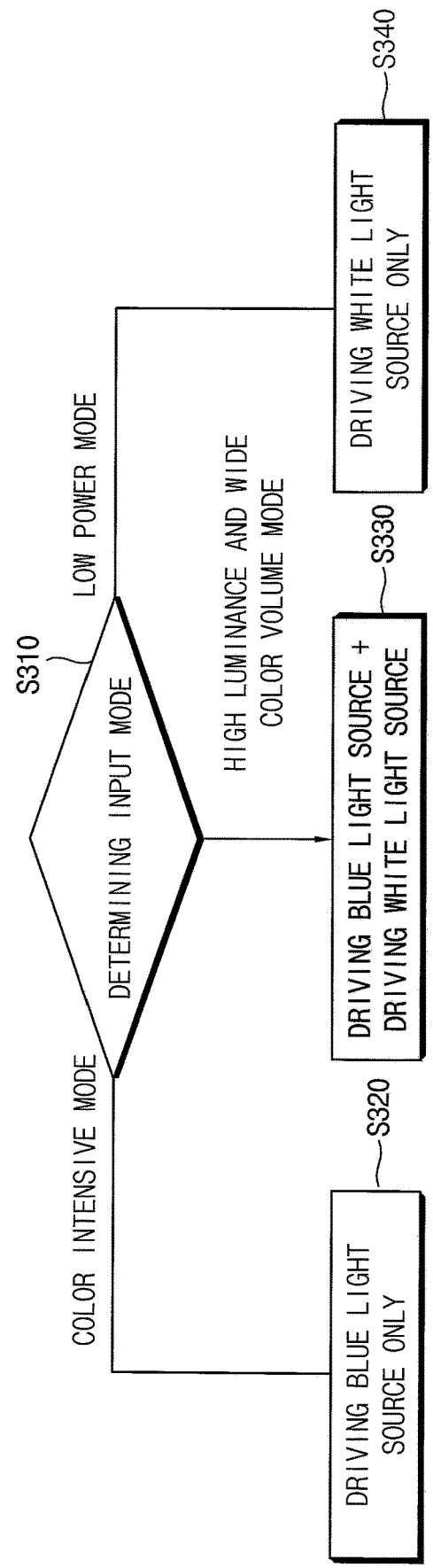
FIG. 9 is a flowchart illustrating an operation of a timing controller of a display apparatus according to an embodiment.

FIG. 9 is a flowchart illustrating an operation of a timing controller of a display apparatus according to an embodiment.

The display apparatus and the method of driving the display apparatus according to the present embodiment is substantially the same as the display apparatus and the method of driving the display apparatus of the previous embodiment explained referring to FIGS. 1 to 7B, except for the operation of the timing controller. Thus, the same or similar reference numerals will be used to refer to the same or similar parts as those described in the previous embodiment of FIGS. 1 to 7B, and any repetitive explanation concerning the above elements will be omitted.

Referring to FIGS. 1 to 5, 7A, 7B, and 9, the display apparatus may include the display panel 10 and the display panel driver. The display panel driver may include the timing controller 20, the gate driver 30, the gamma reference voltage generator 40 and the data driver 50. The display apparatus may further include the backlight unit BLU and the light source driver 60 driving the backlight unit BLU.

For example, more specifically, the display apparatus may include the backlight unit BLU, the first polarizer POL1, the first base substrate 100, the switching element layer TFTL, the liquid crystal layer LC, the common electrode CE, the second polarizer POL2, the planarizing layer 220, the light-recycling filter 215, the first pattern R, the second pattern G, the third pattern B, the blue-light-blocking filter 210, the light-blocking pattern BM, the second base substrate 200 and the anti-reflection layer AR. The planarizing layer 220, the light-recycling filter 215, the first pattern R, the second pattern G, the third pattern B, the blue-light-blocking filter 210, and the light-blocking pattern BM may form the color conversion layer CCS.

The color conversion layer CCS may include a color-converting material to convert the color of light passing through the color conversion layer CCS. The color conversion layer CCS may include the first color area R, the second color area G and the third color area B. The first pattern R is located in the first color area R. The second pattern G is located in the second color area G. The third pattern B is located in the third color area B. The color conversion layer CCS may include quantum dot (QD) particles.

The timing controller 20 may include the dimming control part 22 and the white balance control part 24.

The dimming control part 22 analyzes the input image data IMG and determines the first dimming signal DIMB of the first light source 310 and the second dimming signal DIMW of the second light source 320. For example, the first dimming signal DIMB is a pulse width modulation signal representing the intensity of the first light source 310. For example, the second dimming signal DIMW is a pulse width modulation signal representing the intensity of the second light source 320.

FIG. 9 illustrates the operation of the dimming control part 22. The dimming control part 22 may determine an input mode of the display apparatus (operation S310). An input mode signal representing the input mode may be inputted from a user. Alternatively, the input mode signal representing the input mode may be determined by the input image data IMG.

For example, the input mode signal may include a color intensive mode, a high luminance and wide color volume mode, and a low power mode.

When the input mode signal represents the color intensive mode, the dimming control part 22 may drive only the blue light source 310 (operation S320). The color volume of the red light and the green light generated by the blue light source 310 may be greater than the color volume of the red light and the green light generated by the white light source 320.

When the input mode signal represents the high luminance and wide color volume mode, the dimming control part 22 may drive both the blue light source 310 and the white light source 320 (operation S330). The white light source 320 may be suitable to increase the luminance of the image, and the blue light source 310 may be suitable to widen the color volume of the image.

When the input mode signal represents the low power mode, the dimming control part 22 may drive only the white light source 320 (operation S340). The luminance of the light generated by the white light source 320 may be greater than the luminance of the light generated by the blue light source 310 so that the image having the target luminance may be displayed with low power consumption when only the white light source 320 is driven.

The white balance control part 24 may adjust the white balance of the image, which is displayed according to the turn-on degree of the first light source 310 and the turn-on degree of the second light source 320. The white balance control part 24 analyzes the input image data IMG to control the white balance.

According to the embodiments, the backlight unit BLU includes the first light source 310 and the second light source 320, and the timing controller 20 controls the dimming operation of the first light source 310 and the second light source 320 according to the input image. Thus, the luminous efficiency of the quantum dot display apparatus including the quantum dot particles may be enhanced. Therefore, the display quality of the display apparatus may be enhanced.

Figure 10:
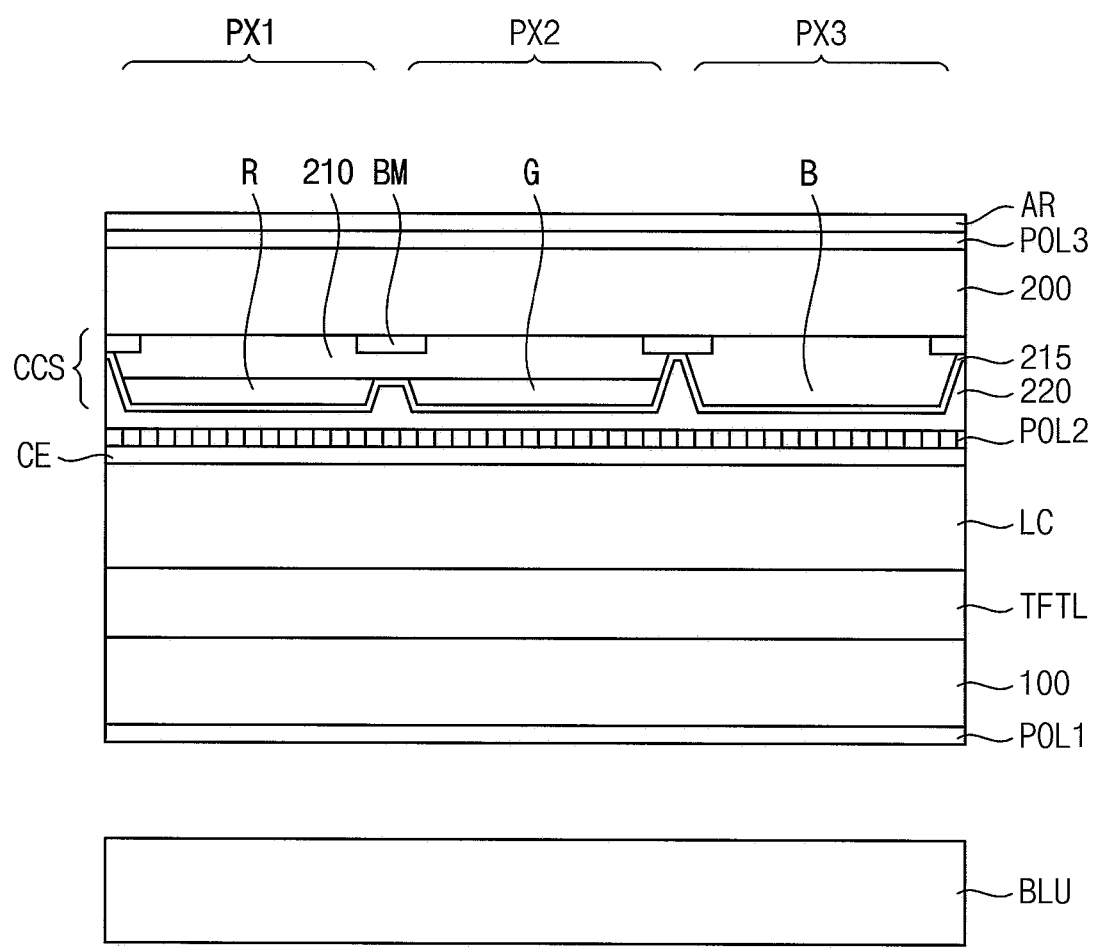
FIG. 10 is a cross-sectional view illustrating a display area of a display apparatus according to an embodiment.

FIG. 10 is a cross-sectional view illustrating a display area of a display apparatus according to an embodiment.

The display apparatus and the method of driving the display apparatus according to the present embodiment is substantially the same as the display apparatus and the method of driving the display apparatus of the previous embodiment explained referring to FIGS. 1 to 7B, except that the display apparatus further includes a third polarizer. Thus, the same or similar reference numerals will be used to refer to the same or similar parts as those described in the previous embodiment of FIGS. 1 to 7B, and any repetitive explanation concerning the above elements will be omitted.

Referring to FIGS. 1 to 5, 7A, 7B, and 10, the display apparatus may include the display panel 10 and the display panel driver. The display panel driver may include the timing controller 20, the gate driver 30, the gamma reference voltage generator 40, and the data driver 50. The display apparatus may further include the backlight unit BLU, and the light source driver 60 for driving the backlight unit BLU.

For example, more specifically, the display apparatus may include the backlight unit BLU, the first polarizer POL1, the first base substrate 100, the switching element layer TFTL, the liquid crystal layer LC, the common electrode CE, the second polarizer POL2, the planarizing layer 220, the light-recycling filter 215, the first pattern R, the second pattern G, the third pattern B, the blue-light-blocking filter 210, the light-blocking pattern BM, the second base substrate 200, the third polarizer POL3, and the anti-reflection layer AR. The planarizing layer 220, the light-recycling filter 215, the first pattern R, the second pattern G, the third pattern B, the blue-light-blocking filter 210, and the light-blocking pattern BM may form the color conversion layer CCS.

The first polarizer POL1 may be on the backlight unit BLU. The first polarizer POL1 may be a linear polarizer that can linearly polarize light passing therethrough. The first polarizer POL1 may be an absorption type polarizing plate such as a polyvinyl alcohol (PVA) polarizing plate, or may be a reflection type polarizing plate such as a wire grid polarizer.

The liquid crystal layer LC may be between the first polarizer POL1 and the second polarizer POL2. The liquid crystal layer LC may include liquid crystal molecules having optical anisotropy. The liquid crystal molecules are driven by an electric field, so that an image is displayed by passing light through, or blocking light with, the liquid crystal layer LC.

The second polarizer POL2 may be on the liquid crystal layer LC. The second polarizer POL2 may be a linear polarizer, which can linearly polarize light passing through. The second polarizer POL2 may be an absorption type polarizing plate such as a polyvinyl alcohol (PVA) polarizing plate, or may be a reflection type polarizing plate such as a wire grid polarizer.

The color conversion layer CCS may include a color-converting material to convert the color of light passing through the color conversion layer CCS. The color conversion layer CCS may include the first color area R, the second color area G, and the third color area B. The first pattern R is located in the first color area R. The second pattern G is located in the second color area G. The third pattern B is located in the third color area B. The color conversion layer CCS may include quantum dot (QD) particles.

The third polarizer POL3 may be on the color conversion layer CCS. The third polarizer POL3 may be a linear polarizer, which can linearly polarize light passing through. The third polarizer POL3 may be an absorption type polarizing plate such as a polyvinyl alcohol (PVA) polarizing plate, or may be a reflection type polarizing plate such as a wire grid polarizer.

A polarizing axis of the third polarizer POL3 may be substantially perpendicular to the polarizing axis of the second polarizer POL2. When the polarizing axis of the second polarizer POL2 is parallel with the second direction D2, the polarizing axis of the third polarizer POL3 may be parallel with the first direction D1, which is substantially perpendicular to the second direction D2.

Accordingly, among the light that has been emitted from the backlight unit BLU and has passed through the first polarizer POL1, the liquid crystal layer LC, the second polarizer POL2, and the color conversion layer CCS, a light component that is converted into the non-polarized light by the color conversion structure in the color conversion layer CCS can pass through the third polarizer POL3, and a light component that is not converted by the color conversion structure and has passed the second polarizer POL2 cannot pass the third polarizer POL3. Accordingly, only a desired light component can pass through the third polarizer POL3, so that the display quality of the display device can be improved.

The anti-reflection film AR may be on the third polarizer POL3. The anti-reflection film AR may be formed by alternately and repeatedly arranging a low refractive index layer having a relatively low refractive index, and a high refractive index layer having a relatively high refractive index. Reflection on a surface of the display apparatus may be reduced by the destructive interference effect.

According to the embodiments, the backlight unit BLU includes the first light source 310 and the second light source 320, and the timing controller 20 controls the dimming operation of the first light source 310 and the second light source 320 according to the input image (e.g., input image data IMG). Thus, the luminous efficiency of the quantum dot display apparatus including the quantum dot particles may be enhanced. In addition, the display apparatus further includes the third polarizer POL3 so that the display quality of the display apparatus may be further enhanced.

According to the embodiments of the display apparatus and the method of driving the display apparatus, the display apparatus includes the backlight unit for emitting the differently colored light, and includes the color conversion layer including the quantum dot particles, so that the display quality of the display panel may be enhanced.

The foregoing is illustrative of the present inventive concept, and is not to be construed as limiting thereof. Although a few embodiments of the present inventive concept have been described, those skilled in the art will readily appreciate that many modifications are possible in the embodiments without materially departing from the novel teachings of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:
a backlight unit comprising a first light source for outputting a first color light, and a second light source for outputting a second color light that is different from the first color light;
a switching element layer on the backlight unit, and comprising a plurality of switching elements;
a liquid crystal layer on the switching element layer;
a color conversion layer on the liquid crystal layer, comprising a color-converting material for converting a color of light passing therethrough, comprising a first color area, a second color area, and a third color area, and comprising quantum dot particles; and
a timing controller comprising a dimming control part for analyzing an input image, and for determining a first dimming signal of the first light source and determining a second dimming signal of the second light source,
wherein, as luminance of the input image increases, a turn-on degree of the second light source increases, and
wherein, as chroma of the input image decreases, the turn-on degree of the second light source increases.

2. The display apparatus of claim 1, wherein the first light source is a blue light source for outputting a blue light, and
wherein the second light source is a white light source for outputting a white light.

3. The display apparatus of claim 2, wherein the first color area is a red color area at which the first color light of the first light source and the second color light of the second light source are converted into red light,
wherein the second color area is a green color area at which the first color light and the second color light are converted into green light, and
wherein the third color area is a blue color area for allowing the first color light and the second color light to pass therethrough.

4. The display apparatus of claim 3, wherein the first color area comprises a first quantum dot particle having a first size,
wherein the second color area comprises a second quantum dot particle having a second size that is different from the first size, and
wherein the third color area comprises a scattering particle.

5. The display apparatus of claim 3, further comprising a blue-light-blocking filter in the first color area and in the second color area.

6. The display apparatus of claim 2, wherein the first light source comprises a blue light emitting diode string comprising a plurality of blue light emitting diodes that output the blue light, and
wherein the second light source comprises a white light emitting diode string comprising a plurality of white light emitting diodes that output the white light.

7. The display apparatus of claim 1, further comprising:
a first polarizer between the backlight unit and the switching element layer; and
a second polarizer between the liquid crystal layer and the color conversion layer.

8. The display apparatus of claim 7, further comprising a third polarizer on the color conversion layer, and having a polarizing axis that is different from a polarizing axis of the second polarizer.

9. The display apparatus of claim 7, further comprising an anti-reflection film on the color conversion layer comprising alternately and repeatedly arranged low refractive index and high refractive index layers.

10. The display apparatus of claim 1, wherein the timing controller further comprises a white balance control part for adjusting a white balance of an image to be displayed according to turn-on degree of the first light source and turn-on degree of the second light source.

11. The display apparatus of claim 1, wherein, when the input image represents an achromatic color, and the luminance of the input image is less than a threshold luminance, the first light source is turned off and the second light source is turned on,
wherein, when the input image represents the achromatic color, and the luminance of the input image is equal to, or greater than, the threshold luminance, the first light source is turned on and the second light source is turned on, and
wherein, when the input image represents a chromatic color, the first light source is turned on and the second light source is turned on.

12. The display apparatus of claim 1, wherein the timing controller is configured to determine the first dimming signal of the first light source and the second dimming signal of the second light source according to a input mode signal,
wherein, when the input mode signal represents a color intensive mode, the first light source is turned on and the second light source is turned off, wherein, when the input mode signal represents a high luminance and wide color volume mode, the first light source is turned on and the second light source is turned on, and wherein, when the input mode signal represents a low power mode, the first light source is turned off and the second light source is turned on.

13. A method of driving a display apparatus, the method comprising:

outputting a first color light using a first light source;

outputting a second color light using a second light source;

converting the first color light of the first light source and the second color light of the second light source into red at a first color area of a color conversion layer;

converting the first color light of the first light source and the second color light of the second light source into green at a second color area of the color conversion layer;

passing through the first color light of the first light source and the second color light of the second light source at a third color area of the color conversion layer; and determining a first dimming signal of the first light source and a second dimming signal of the second light source based on an input image, wherein, as luminance of the input image increases, a turn-on degree of the second light source increases, and wherein, as chroma of the input image decreases, the turn-on degree of the second light source increases.

14. The method of claim 13, further comprising:

turning on the first light source and maximally turning on the second light source when the luminance of the input image is equal to, or greater than, a threshold luminance, and the input image represents an achromatic color;

turning on the first and second light sources when the luminance of the input image is equal to, or greater than, the threshold luminance, and the input image represents a chromatic color; and turning on the first light source and turning off the second light source when the luminance of the input image is less than the threshold luminance.

15. The method of claim 13, further comprising:

turning off the first light source and turning on the second light source when the input image represents an achromatic color, and the luminance of the input image is less than a threshold luminance;

turning on the first and second light sources when the input image represents the achromatic color and the luminance of the input image is equal to, or greater than, the threshold luminance; and turning on the first and second light sources when the input image represents a chromatic color.

16. The method of claim 13, further comprising determining the first dimming signal of the first light source and the second dimming signal of the second light source according to a input mode signal;

turning on the first light source and turning off the second light source when the input mode signal represents a color intensive mode;

turning on the first and second light sources when the input mode signal represents a high luminance and wide color volume mode; and turning off the first light source and turning on the second light source when the input mode signal represents a low power mode.

17. A display apparatus comprising:

a backlight unit comprising a first light source for outputting a first color light, and a second light source for outputting a second color light that is different from the first color light;

a switching element layer on the backlight unit, and comprising a plurality of switching elements;

a liquid crystal layer on the switching element layer;

a color conversion layer on the liquid crystal layer, comprising a color-converting material for converting a color of light passing therethrough, comprising a first color area, a second color area, and a third color area, and comprising quantum dot particles; and a timing controller comprising a dimming control part for analyzing an input image, and for determining a first dimming signal of the first light source and determining a second dimming signal of the second light source, wherein, when luminance of the input image is equal to, or greater than, a threshold luminance, and the input image represents an achromatic color, the first light source is turned on and the second light source is maximally turned on, wherein, when the luminance of the input image is equal to, or greater than, the threshold luminance, and the input image represents a chromatic color, the first light source is turned on and the second light source is turned on, and wherein, when the luminance of the input image is less than the threshold luminance, the first light source is turned on and the second light source is turned off.

* * * * *